Feb. 14, 1961 L. BORIOLO 2,972,000
PLATE SHEATH FOR SECONDARY OR STORAGE BATTERIES
AND METHOD FOR PRODUCING SAME
Filed Jan. 30, 1957 2 Sheets-Sheet 1
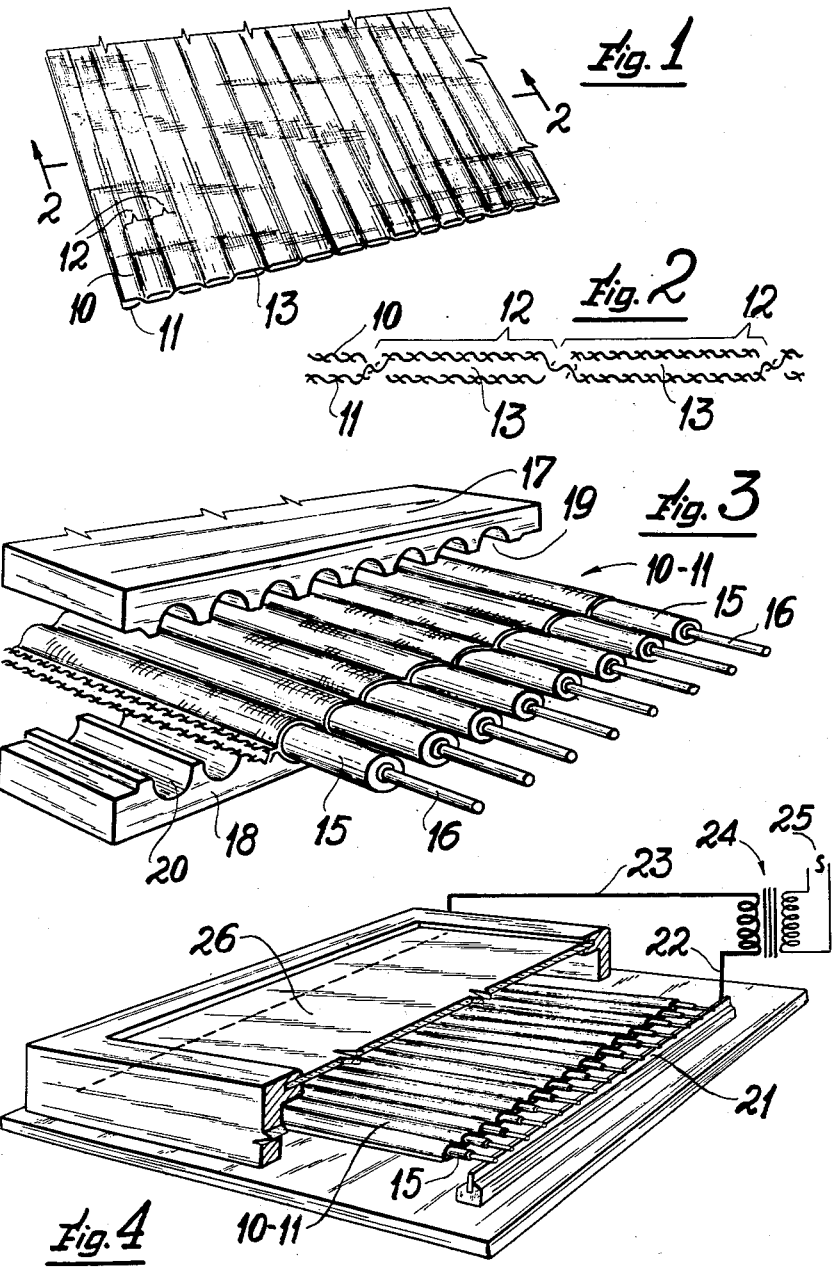

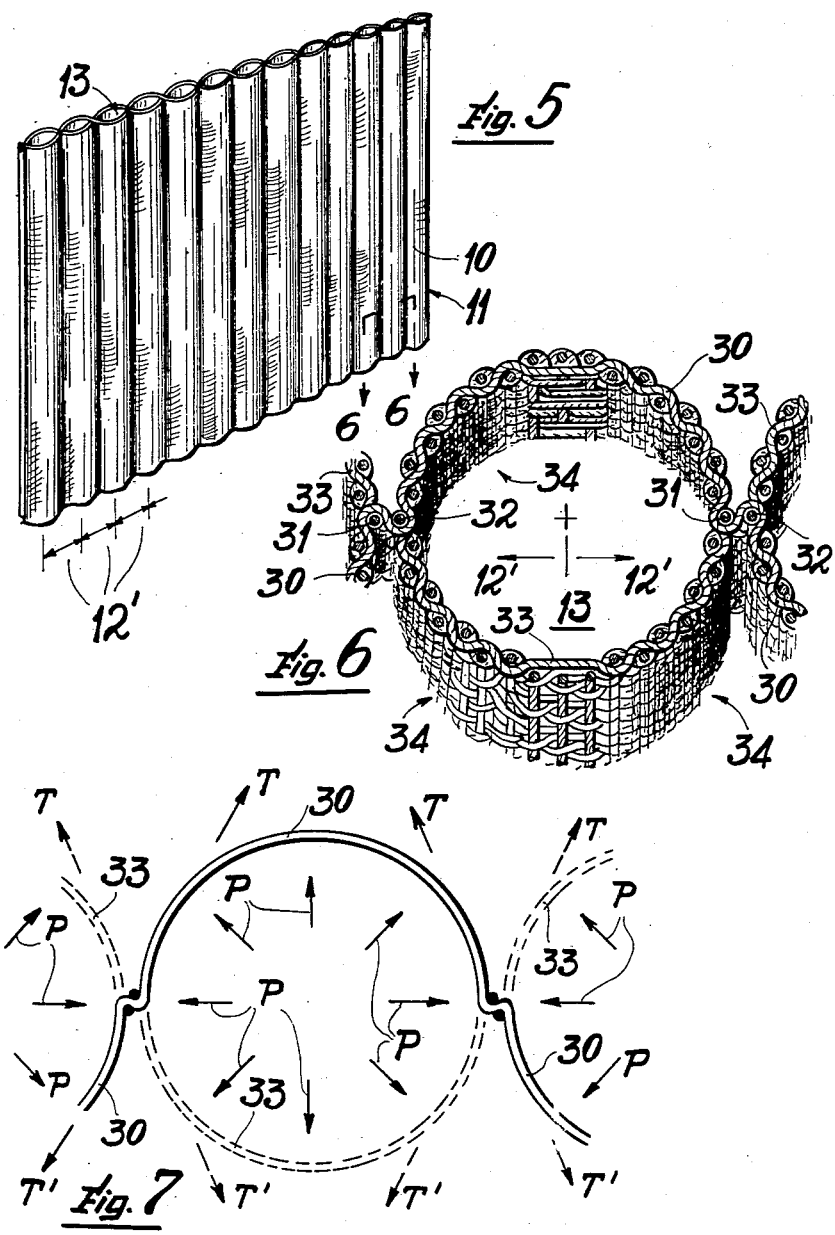

United States Patent Office 2,972,000
Patented Feb. 14, 1961

2,972,000

PLATE SHEATH FOR SECONDARY OR STORAGE BATTERIES AND METHOD FOR PRODUCING SAME

Lino Boriolo, 1 Via Giusti, Cinisello Balsamo, Milan, Italy

Filed Jan. 30, 1957, Ser. No. 637,151

Claims priority, application Italy Feb. 3, 1956

8 Claims. (Cl. 136—43)

My invention relates to improvements in plate sheaths for electric secondary or storage batteries and, more particularly, it is related to a new and improved sheath of textile material having a plurality of parallel, spaced and cylindrical pockets integrally formed thereinto, each of said pockets being intended to enclose one pencil of active material positioned about an individual axially arranged conductive spine.

My invention is further related to a new and advantageous method for producing a plate sheath of the aforementioned type and constructed of suitable thermoplastic and acid-resisting thread material.

It is a specific object of my invention to produce a textile sheath of the above type which may be produced at relatively low cost, which is strong, durable, adapted to resist most severe abuse and which may be provided with the pencils of active material, by forming the said pencils within the individual pockets of the sheath by pouring thereinto the active material in powder form and by subjecting the same to vibration or like mechanical treatment for having said material compacted about the individual conductive and axially arranged spine and in firm and intimate contact with the textile sidewall of said pockets.

It is known to those skilled in the art to which this invention appertains that the construction of textile plate sheaths of the type including a plurality of spaced and parallel individual pockets has been heretofore proposed. For instance, in the prior U.S. Patent No. 2,350,752 to Ernest Graf, assignor to The Electric Storage Battery Company, Philadelphia, Pa., a plate of the aforementioned general character has been fully made known.

In the manufacture of electric plates for batteries the textile sheaths of the said general type have however been found subject to some objections, and mainly to the limitation inherent in the very difficult step of forming the pencils of active material about the individual spines outside the pockets designed to hold the active material in the battery. In general, said pencils are not or are poorly self-supporting and must be formed within metal tubes which are successively withdrawn from the pockets upon insertion of said pencils in said pocket. For the efficiency and the long life of the plate a very intimate contact between the active material and the sidewall of the pocket has proved essential. If the active material has been not previously strongly pressed within its housing means and caused to intimately contact the sidewalls of said housing means, the pencils may disgregate under the electro-chemical actions in the battery.

It is therefore a further specific object of this invention to provide a new and advantageous textile sheath of the above type, wherein each of the individual pockets thereof is formed and set in a cylindrical shape and dimensioned for directly forming the pencils of active material thereinto, and wherein the textile material is made self-supporting by curing steps in the required shape and dimension of the individual pockets and in the predetermined intervals therebetween.

A still further specific object of this invention is to provide a new and advantageous method for producing plate sheaths of textile material, including the steps of weaving a fabric from threads of acid-resisting synthetic resin of thermo-plastic nature, the said fabric being woven to include a plurality of parallel pockets therein, dimensioned for insertion of cylindrical inner forming die rods of a diameter corresponding to the diameter of the pencils to be formed in the plate, of inserting one of said inner forming die rods into each pocket of the said fabric, of subjecting the said fabric including the said rods in the pockets thereof to heat, of continuing the heat treatment until the said thermo-plastic synthetic material sets in self-supporting condition about said rods, and then of removing the said rods from the said pockets.

According to one embodiment of the method of the invention, the step of curing the synthetic material is carried out by heating the said inner forming die rods, so that the heat may be transmitted from the said rods to sidewalls of the pockets arranged thereabout. Such a curing step has been found very advantageous to attain a perfectly uniform heat setting action at any location of said sidewalls and for producing a self-supporting sheath provided with perfectly cylindrical pockets having smooth inner surfaces, well adapted for introduction of the active material and for forming the individual pencils therein.

Further, according to a preferred form of embodiment of the invention, the fabric is woven, according to current knowledge in the art, in the form of a double or twin fabric, including an upper and a lower textile structure, and wherein the warp threads (or the weft threads, according to known modifications of such textures) of the two structures are interwoven at predetermined intervals to form parallel and spaced lines of crossing of the structures and therefore to form the individual pockets in each interval.

Other features and advantages of my invention are in part obvious and will in part be made apparent as this description proceeds. The novel features which are considered as characteristic for the invention are set forth in particular in the appended claims. The invention itself, however, both as to its construction and to the method for carrying out the same, will be best understood from the following detailed description of a specific embodiment thereof, when read in connection with the accompanying drawings, forming an essential component of this disclosure, and wherein:

Figure 1 is a perspective fragmentary view of a portion of a double fabric adapted for producing the textile sheet according to the method of the invention;

Figure 2 illustrates, on an enlarged scale, a cross-sectional view of a fragment of the same double fabric, taken along line 2—2 of Fig. 1;

Figure 3 is a perspective diagrammatical view of a portion of said fabric including the cylindrical inner heating and forming die elements in the pockets thereof, and of other auxiliary outer forming die elements which may be used to heat set the pockets;

Figure 4 is a perspective, fragmentary and somewhat simplified view of a heat setting apparatus adapted for carrying out the heat setting step;

Figure 5 is a perspective view of a textile sheath produced according to this invention;

Figure 6 illustrates, on a greatly enlarged scale, the details of the texture of the sheath, as apparent in a sectional view taken along line 6—6 of Fig. 5, and Figure 7 is a diagrammatical view of a detail of Fig. 6, wherein the features which give to same its advantageous stress-resisting character are made apparent.

Referring now to the drawings, wherein like parts and elements are indicated by like reference characters throughout the several figures:

According to the invention, the textile sheath is manufactured by producing a fabric such as shown in Figs. 1 and 2, including two textile structures 10 and 11, the warp (or the weft) threads of which intersect at uniformly spaced intervals 12 to form a plurality of like elongated and parallel pockets 13 between the said structures. The said intervals 12 are dimensionally determined by the size of the cylindrical pencils of active material which are intended to be formed into said pockets 13, upon setting of the same into a cylindrical shape.

The said textile material is constructed of acid-resisting threads of a suitable thermo-plastic synthetic resin, preferably of the acrylic group. In particular, a vinyl chloride-acrylonitrile copolymer resin has been found and proved to be one of the best synthetic materials for producing the sheath of the invention. Preferably, the fabric is made by weaving multi-fiber threads produced by spinning and twisting staple fibers of various sizes, and preferably of staple lengths from 4 to 5 inches. Of course, the above features are not essential for carrying out the invention but such thread material has been found satisfactory as to resilience and stress-resistance of the fabric during the expansion of the pencils of active material, and for passage of the battery electrolyte through the pocket's sidewalls, for improving the efficiency of the battery.

Of course, other acid-resisting thread materials and various blends of such materials might be made use of in carrying out the invention, according to the various requirements and the availability of materials. Attention must be paid to the chemical nature of the material, which must not develop chlorine or chlorine derivatives during the operation of the electrical battery.

By making use of the chemical character and nature of the material, the above described fabric may be made self-supporting by subjecting the material to heat which will cause it to set in the desired shape. Said step may be performed preferably by making use of heating means of the type shown, in a somewhat simplified way, in Fig. 3, and of a heat setting apparatus of the type shown in Fig. 4, or by making use of equivalent procedures and means.

In Fig. 3 the fabric 10—11 is shown with a plurality of heaters 15 fitted into each pocket of the fabric. Any one of said heaters 15 consists of an elongated cylindrical heating rod element of the type including a resistor embedded and protected inside a metal tube and having terminals 16 at both end portions of the element. For carrying out the heat setting step of the invention, heating rod elements 15 of uniform outer diameter corresponding to the diameter of the pencils of active material to be formed are provided.

The time and the temperature of heat treatment are selected according to the character of the synthetic material. Such treatment must be applied until the fabric will stiffen and shrink about the various heating elements. In other words, the heating step is performed to cause the material to stiffen and stabilize about and against the heating elements, to form corresponding cylindrical and stabilized creases thereabout. Owing to the fact that the fibers tend to shorten under heat, the several pockets are precisely shaped and dimensioned about each corresponding heating element.

Shrinkage of the fabric under heating will somewhat reduce the intervals 12, the amount of said shortening depending on the character and nature of the material and on the heat applied thereto. In order to produce sheaths to a desirable very strict standard of size, in respect to dimensions of the pockets, to spacings between the pocket's axes and to the overall size of the article of manufacture, outer forming die means such as indicated by numerals 17 and 18 in Fig. 3 may be advantageously provided.

Said outer forming die means 17 and 18 consist of shaped plate members to be applied against the two faces of the sheath material under manufacture, during the said heat setting step, and preferably as soon as the shrinkage thereof is nearly completed. Upon application of said forming die members (shown in Fig. 3 in spaced relationship to the sheath material), the textile material conforms in shape and size of its pocket forming parallel and spaced portion to the shape and position of corresponding semi-cylindrical grooves or recesses 19 and 20 provided in the opposed faces of said members 17 and 18, respectively.

In the described form of embodiment of the method of the invention, including the use of inner forming die heating rod elements 15, the essential shaping and sizing of the operative parts of the sheath is effectively attained by the stiffening and shrinking of the synthetic material about said heating rod elements. However, any other suitable means adapted to locking said elements in a predetermined parallel and spaced relationship might be made use of.

The said heat setting step may be performed in open air or, preferably, within a proper enclosure such as an apparatus of the type shown in Fig. 4 and wherein the terminals 16 of the various heating rod elements 15 are borne in coplanar relationship on metallic rods 21, but one of which is shown in the drawing. The feeding circuits of each resistor included in said heating rod elements 15 may be completed between the said support rods 21, through conductors 22 and 23 and a tension-reducing transformer 24, connected to an A.C. source.

The provision of conductive support rods such as 21 allows the feeding of each resistor while the various heating rod elements are subject to relative movement in the plane defined by the edges of said support rod elements, owing to the shrinkage of the material under treatment. The various operative elements included in the apparatus might be protected by a removable cover such as 26 and the auxiliary outer forming die members 17 and 18 of Fig. 3 may be protected by said cover, if desired, and connected to suitable external operator-controlled means (not shown) for having said members spaced from and pressed against the material.

Different methods and means might obviously be provided for performing the heat setting of the sheath material to stabilize the same in the desired cylindrical shape and predetermined size of the various pockets thereof; for example, the sheath material, upon insertion of cylindrical inner forming die rod means in each pocket such as cylindrical metallic rods, porcelain rods or rods made of other material, may be subjected to the required heating in an oven. The above described form of embodiment including the provision of inner forming die heating rod elements is however particularly advantageous, owing to the fact that the heat may be applied to the inner face and evenly throughout the sidewalls of the pockets. Further, the very intimate contact of the inner surface of the textile sidewalls of the pockets with the heated outer smooth surface of the heating rod element held therein has been proved to cause said inner surface to set and stabilize in a very advantageous smooth shape, under the combined actions of heat and of the pressure due to shrinking of the material, which squeezes itself about the heating rods.

Upon performance of the said heat setting, shaping and stabilizing process a perfectly self-supporting plate sheath of the type shown in Fig. 5 is produced. In said plate sheath the various pockets 13 are set in the most desired cylindrical shape and in the predetermined standard size, and the axes of the pockets are positioned in the required parallel relationship at predetermined intervals 12′.

The sheath is therefore ready for receiving the conductive electrode forming spines (not shown) already connected to or integral with a conventionally constructed conductive bar, and for receiving the active material in powder form, which may be poured and compacted, by vibrating or by other known methods, in the cylindrical pockets of the sheath.

From the above it will be apparent to those skilled in the art to which this invention appertains that the invention provides a new and highly advantageous method for readily and inexpensively producing a new textile plate sheath of the character described, which is not subject to the objections common to the generally corresponding articles of manufacture heretofore proposed, and which, in particular, may be provided with pencils of active material, directly formed in the pockets of the sheath, by applying known principles for producing batteries of the type including multi-pencil type positive electrodes.

In mass producing the sheath of the invention, the double fabric would obviously be woven in long strips and then cut into portions suited for performing the described heat setting and stabilizing process. The size of said portions would be determined by the size of the heat setting apparatus. In particular, such size would be determined by the length of heating rod elements which could easily be handled, inserted into and withdrawn from the pockets of the material, and by the number of heating rod elements which might be made use of in one portion of material, without interfering with the contraction of the material under heat. The size of said portions might further be determined, when possible, by the size of the actual plate sheaths to be produced, so that said portions may then be cut to plate size without unduly wasting material.

From a consideration of Figs. 6 and 7 certain useful features and advantages of the preferred type of double fabric provided by the invention may be readily understood.

According to the known pattern of double fabrics wherein the warp threads and the weft threads alternate at predetermined intervals, a textile sheath of the character described above may be so woven that (for example) a warp thread such as 30, upon being carried along half the sidewall of one pocket 13, on one face of the sheath, and upon being interwoven with one or more weft threads such as 31 and 32, passes along the other face of the textile material to be interwoven at and to form the oppositely located half sidewall of the adjacent pocket, and the adjacent warp threads are interwoven in symmetrical arrangement, such as 33 forming the oppositely located half sidewall of the pockets.

On the other hand, the several respective weft threads are evenly interwoven with the various warp threads such as 30 and 34 along the faces of the fabric, to form either the complete texture such as 34 of the two semi-cylindrical half sidewalls of any pocket and the portions including the wefts such as 31 and 32 wherein a pocket is connected to the adjacent ones.

A textile plate sheath of the type described is particularly adapted to resist heaviest stresses and, in particular, the radial pressures exerted by the active material on the sheath, during the electro-chemical activity of the battery. Such pressures are radially distributed about the axis of the pocket as indicated by arrows P in Fig. 7, and cause tangential stresses in the warp threads, as indicated by arrows T and T'.

The alternation of the said warp threads such as 30 and 33 on the two sides of the pockets puts said threads in the most favourable condition to resist said stresses, and also in the case of breaking of one of said interlocking weft threads such as 31 and 32 the shape and the resistance of the sheath is not substantially altered, while the uniform texture of the sidewalls of the pockets, such as 34, secures the relative arrangement of the fabric at any point and portion thereof.

By combining the above useful feature of the invention of providing the described fabric in self-supporting, stiffened and stabilized condition when the pockets thereof have been set in coplanar, parallel, and spaced arrangement at given intervals and in cylindrical standard sized shape, with the provision of a textile structure as shown in Fig. 6, a particularly stress, wear and abuse resisting plate sheath may be produced.

In such battery plates the radial pressures P (Fig. 7) exerted by the active material which expands when electro-chemically operating are evenly distributed about the axis of any pocket and over the whole length thereof, and the described textile structure is adapted to resist said pressure, evenly sustained by every correspondingly located warp thread, while the complete interwoven structure such as 34 (Fig. 6) firmly connects said warp threads at any level in respect to the pockets' axis. No thread in the structure is preferentially stressed and every thread thereof is subject to tension only. In the event of exceptional stress or abuse at any location of the textile structure, which might cause one or more threads to break, the plate remains in operative condition.

It is believed to be evident that the present invention includes several advantageous features, in particular a new textile structure adapted to be formed and stabilized in the shape and condition of a multi-pocket plate sheath, as well as a new method for having the said textile material formed and stabilized as described above. Such an article of manufacture and such a method for producing the same according to the invention include the provision of an acid-resisting thread material which must be settable into a self-supporting and stablized status or condition. While I have suggested the use of synthetic resins of the acrylic group, and in particular of a vinyl chloride-acrylonitrile copolymer resin, such as the commercially available "Dynel" of the Carbide and Carbon Chemicals Company, I do not intend to be limited to such resins for carrying out the invention, considering that other resins might prove to be suitable for usefully carrying out the invention, provided that such other materials are chemically adapted for the aforementioned applications, produced in thread form and suitable to be woven into a fabric of the type described or its equivalent, and then heat settable for stabilization in self supporting status in a predetermined shape.

It will be understood too that each of the features described above or any combination thereof may also find an useful application in other types of sheath differing from the one described above.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalents of the invention as defined in and by the appended claims.

Having thus described the invention and the method for producing same, what I claim as new and desire to have protected by Letters Patent is:

1. A textile plate sheath for electric storage batteries of the type wherein a battery plate includes a plurality of individual elements of active material located in spaced individual pockets of said sheath, the sheath comprising two spaced layers of fabric made from heat-shrinkable thermoplastic acid-resistant material incapable of giving up chlorine and chlorine derivatives when exposed to the operating conditions of said electric storage battery, said fabric being in heat-shrunk stressed condition so as to be shape-retaining; and portions of said fabric interlinking said two layers so as to form a plurality of pockets between said layers and said portions.

2. A textile plate sheath for electric storage batteries of the type wherein a battery plate includes a plurality of elongated individual elements of active material located in spaced individual pockets of said sheath, the sheath comprising two spaced layers of fabric made from heat-shrinkable thermoplastic material selected from the group consisting of acrylic resins and vinyl chloride-acrylonitrile copolymers, said fabric being in heat-shrunk stressed condition so as to be shape-retaining, said layers being integrally interlinked along a plurality of spaced elongated areas so as to form a plurality of elongated tubular pockets between said layers.

3. A textile plate sheath for electric storage batteries of the type wherein a battery plate includes a plurality of individual elements of active material located in spaced individual pockets of said sheath, the sheath comprising two spaced layers of fabric made from heat-shrinkable thermoplastic acid-resistant material incapable of giving up chlorine and chlorine derivatives when exposed to the operating conditions of said electric storage battery, said fabric being in heat-shrunk stressed condition so as to be shape-retaining, said layers being formed with a plurality of substantially semicylindrical parallel corrugations and integrally joined along the straight edges of said semicylindrical corrugations so as to form a plurality of substantially cylindrical pockets between said layers.

4. A textile plate sheath for electric storage batteries of the type wherein a battery plate includes a plurality of individual elements of active material located in spaced individual pockets of said sheath, the sheath comprising a double-layer fabric made from heat-shrinkable thermoplastic material having an acrylic component, said fabric being in heat-shrunk and stressed condition so as to be shape-retaining, the layers of said fabric being interconnected along a plurality of spaced parallel lines so as to form a plurality of pockets between said layers in the area between any consecutive two of said lines, said pockets being of tubular substantially cylindrical shape.

5. In the manufacture of plate sheaths for electric storage batteries of the type wherein a battery plate includes a plurality of individual elements of active material having a predetermined shape and size, and located in individual respective pockets of said sheath, the steps of preparing a fabric from heat-shrinkable thermoplastic acid-resistant material incapable of giving up chlorine and chlorine derivatives when exposed to the operating conditions of said electric storage battery having therein a plurality of pockets of said predetermined shape, but in collapsed condition and of enlarged size; expanding said pockets to said predetermined shape; and subjecting said fabric to a temperature sufficient to shrink said fabric while limiting shrinkage of said pockets to said predetermined shape and size, whereby a shape-retaining structure having pockets of said predetermined shape and size is obtained.

6. In the manufacture of plate sheaths for electric storage batteries of the type wherein a battery plate includes a plurality of individual elements of active material having a predetermined shape and size, and located in individual respective pockets of said sheath, the steps of preparing a fabric from heat-shrinkable thermoplastic material selected from the group consisting of acrylic resins and vinyl chloride-acrylonitrile copolymers having therein a plurality of pockets of said predetermined shape, but in collapsed condition and of enlarged size; expanding said pockets to said predetermined shape; subjecting said fabric to a temperature sufficient to shrink said fabric while limiting shrinkage of said pockets to said predetermined shape and size; and cooling said fabric below said temperature, whereby a shape-retaining structure having pockets of said predetermined shape and size is obtained.

7. A textile plate sheath for electric storage batteries of the type wherein a battery plate includes a plurality of individual elements of active material located in spaced individual pockets of said sheath, the sheath comprising two spaced layers of heat shrinkable fabric, said fabric including threads essentially consisting of heat-shrinkable thermoplastic acid-resistant material incapable of giving up chlorine and chlorine derivatives when exposed to the operating conditions of said electric storage battery, said fabric being in heat-shrunk stressed condition so as to be shape-retaining; and portions of said fabric interlinking said two layers so as to form a plurality of pockets between said layers and said portions.

8. In the manufacture of plate sheaths for electric storage batteries of the type wherein a battery plate includes a plurality of individual elements of active material having a predetermined shape and size, and located in individual respective pockets of said sheath, the steps of preparing a heat-shrinkable fabric, said fabric including threads essentially consisting of heat-shrinkable thermoplastic acid-resistant material incapable of giving up chlorine and chlorine derivatives when exposed to the operating conditions of said electric storage battery and having therein a plurality of pockets of said predetermined shape, but in collapsed condition and of enlarged size; expanding said pockets to said predetermined shape; and subjecting said fabric to a temperature sufficient to shrink said fabric while limiting shrinkage of said pockets to said predetermined shape and size, whereby a shape-retaining structure having pockets of said predetermined shape and size is obtained.

References Cited in the file of this patent

UNITED STATES PATENTS

| | | |
|---|---|---|
| 2,176,428 | Kershaw | Oct. 17, 1939 |
| 2,266,546 | Galloway | Dec. 16, 1941 |
| 2,343,970 | Galloway | Mar. 14, 1944 |
| 2,350,752 | Graf | June 6, 1944 |